(12) United States Patent
Reiners et al.

(10) Patent No.: US 12,227,064 B2
(45) Date of Patent: Feb. 18, 2025

(54) BATTERY HOUSING FOR ELECTRIC VEHICLES

(71) Applicant: Ford Global Technologies, LLC, Dearborn, MI (US)

(72) Inventors: Robert Reiners, Ypsilanti, MI (US); Mathias Huber, Brighton, MI (US); Samuel Jeffrey Tomlinson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 17/589,273

(22) Filed: Jan. 31, 2022

(65) Prior Publication Data

US 2023/0241956 A1 Aug. 3, 2023

(51) Int. Cl.
*B60K 1/04* (2019.01)
*H01M 50/244* (2021.01)
*H01M 50/262* (2021.01)
*H01M 50/271* (2021.01)

(52) U.S. Cl.
CPC ............. *B60K 1/04* (2013.01); *H01M 50/244* (2021.01); *H01M 50/262* (2021.01); *H01M 50/271* (2021.01); *H01M 2220/20* (2013.01)

(58) Field of Classification Search
CPC .................. H01M 50/244; H01M 2220/20
See application file for complete search history.

(56) References Cited

U.S. PATENT DOCUMENTS 8,900,744 B2 * 12/2014 Loo .................... B60L 50/64
429/185
11,186,183 B2 * 11/2021 Frost .................. B60L 50/66
2016/0351971 A1 * 12/2016 Kim .................... H01M 50/211

FOREIGN PATENT DOCUMENTS

| CN | 2012124131 | 6/2012 |
| CN | 204029893 | 12/2014 |
| CN | 204361139 | 5/2015 |
| JP | 2015230891 | 12/2015 |

\* cited by examiner

Primary Examiner — Jason D Shanske
Assistant Examiner — James J Triggs
(74) Attorney, Agent, or Firm — Burris Law, PLLC

(57) ABSTRACT

A battery housing for an electric vehicle includes a cover, a body, and a seal. The body is secured to the cover and includes a first edge section and a second edge section secured to and overlapping the first edge section. The seal is engaged with the cover and includes a channel receiving the first and second edge sections of the body. The first and second edge sections of the body are engaged with the seal within the channel.

20 Claims, 4 Drawing Sheets

BATTERY HOUSING FOR ELECTRIC VEHICLES

FIELD

The present disclosure relates to a battery housing for an electric vehicle, and more particularly to an electric vehicle including a battery housing.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs disposed within a battery tray and having lithium-ion batteries, for example, or any other suitable electrical power storage units. The battery pack typically powers one or more motors to drive a set of wheels. The size and weight of the battery pack is typically greater for electric vehicles capable of traveling long distances, for example, therefore, requiring larger battery trays. The present disclosure addresses these issues related to battery trays that house battery packs in electric vehicles.

SUMMARY

This section provides a general summary of the disclosure and is not a comprehensive disclosure of its full scope or all of its features.

In one form, the present disclosure provides a battery housing for an electric vehicle that includes a cover, a body, and a seal. The body is secured to the cover and includes a first edge section and a second edge section secured to and overlapping the first edge section. The seal is engaged with the cover and includes a channel receiving the first and second edge sections of the body. The first and second edge sections of the body are engaged with the seal within the channel.

In variations of the battery housing of the above paragraph, which may be implemented individually or in any combination: a liquid sealant is disposed within the channel of the seal; a connecting member is located outwardly with respect to the second edge section, the connecting member is secured to an outer surface of the second edge section and removably secured to the cover; the seal is spaced apart from the connecting member; the connecting member is removably secured to the cover via a mechanical fastener; the seal is engaged with a planar wall of the cover; the channel is formed by a U-shaped body of the seal; the seal is a bulb seal; the first and second edge sections of the body are secured together via welding or an adhesive; the first and second edge sections are vertical walls; and the cover overlaps the first and second edge sections of the body.

In another form, the present disclosure provides a battery housing for an electric vehicle that includes a lid, a body, and a seal. The body is secured to the lid and includes a plurality of segmented walls. A first wall of the plurality of walls includes a first edge section that is secured to and overlaps a second edge section of a second wall of the plurality of walls. The seal is engaged with the lid and includes a channel receiving the first and second edges sections of the body. The first and second edge sections of the body are engaged with the seal within the channel. A liquid sealant is disposed within the channel of the seal.

In variations of the battery housing of the above paragraph, which may be implemented individually or in any combination: the seal comprises at least one first sealing member extending from a first inner surface within the channel and engaging the first edge section; and the seal comprises at least one second sealing member extending from a second inner surface within the channel and engaging the second edge section.

In yet another form, the present disclosure provides a battery housing for an electric vehicle that includes a cover, a body, a seal, and a connecting member. The body is removably coupled to the cover and includes a first vertical wall and a second vertical wall secured to and overlapping the first vertical wall. The seal is engaged with the cover and includes a channel receiving the first and second vertical walls of the body. The first and second vertical walls of the body are engaged with the seal within the channel. The connecting member is spaced apart from the connecting member and is located outwardly with respect to the second vertical wall. The connecting member is secured to an outer surface of the second vertical wall and is secured to the cover. A liquid sealant is disposed within the channel of the seal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
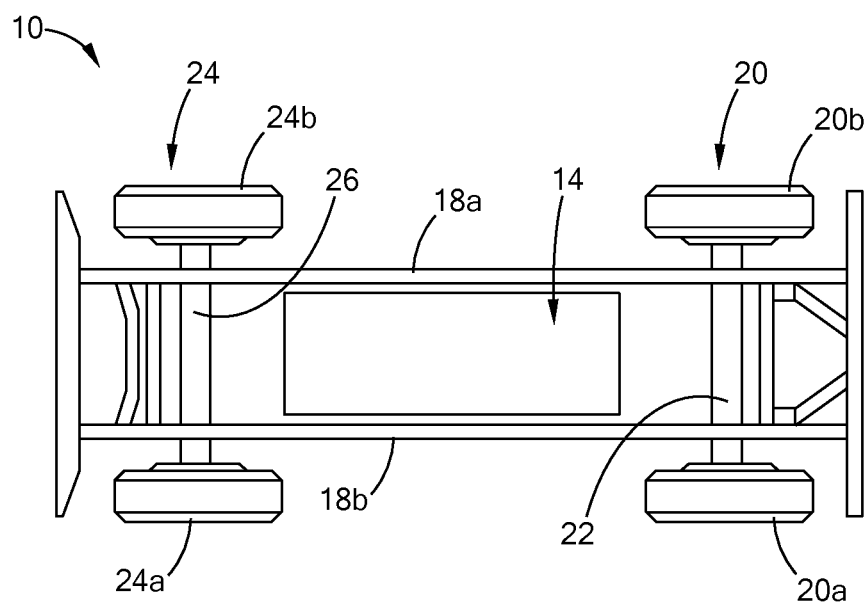
FIG. 1 is a schematic view of a vehicle including a battery housing according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery housing assembly 14. The vehicle frame 12 is the main supporting structure of the vehicle 10, to which various components are attached either directly or indirectly. The vehicle frame 12 includes opposed longitudinal rails 18a, 18b. The rails 18a, 18b are spaced apart from each other and may establish a length of the vehicle frame 12.

The battery housing assembly 14 powers a rear motor (not shown) to drive rear wheels 20a, 20b of a set of rear wheels 20 via a rear axle 22. Similarly, the battery housing assembly 14 powers a front motor (not shown) to drive front wheels 24a, 24b of a set of front wheels 24 via a front axle 26.

Figure 2:
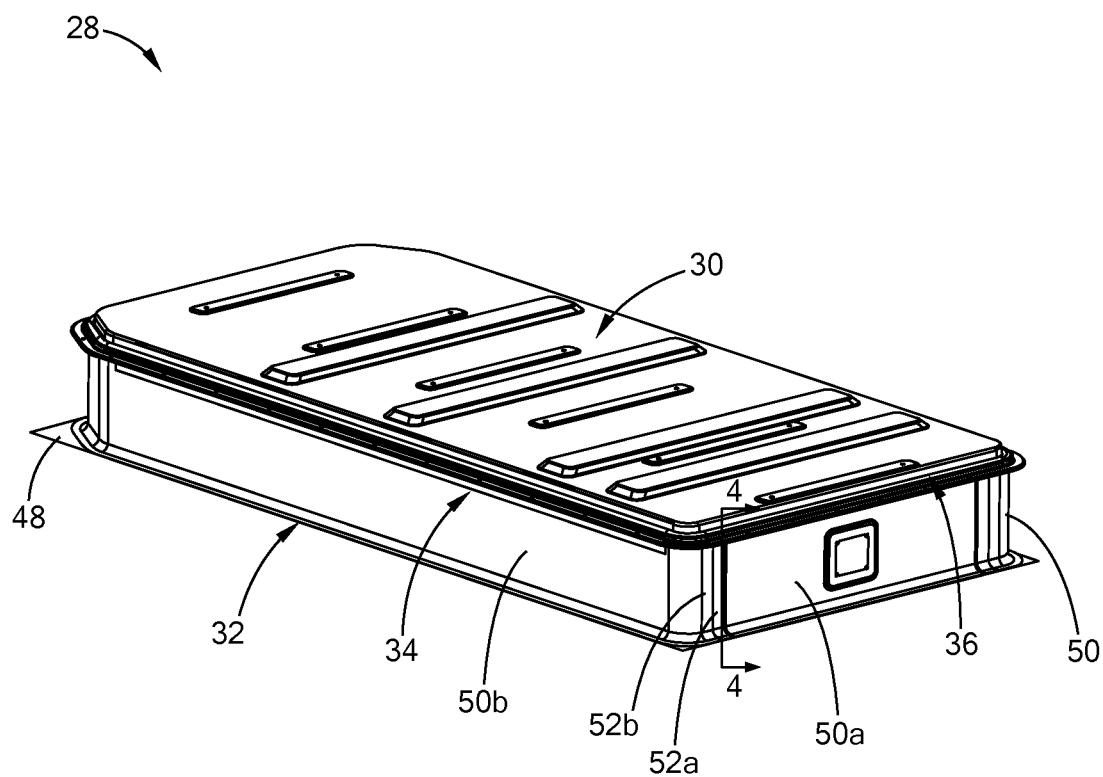
FIG. 2 is an exploded view of the battery housing of FIG. 1.
Figure 3:
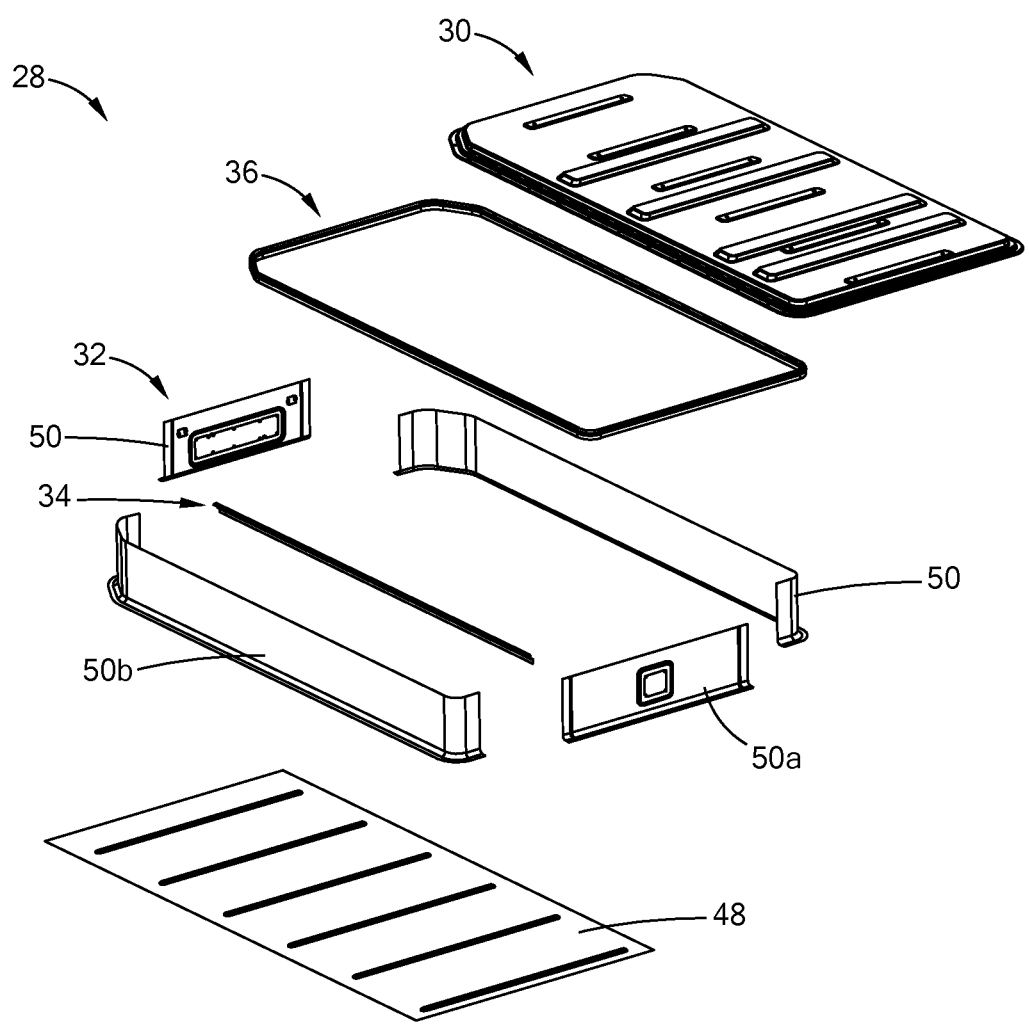
FIG. 3 is a perspective view of the battery housing of FIG. 1.
Figure 4:
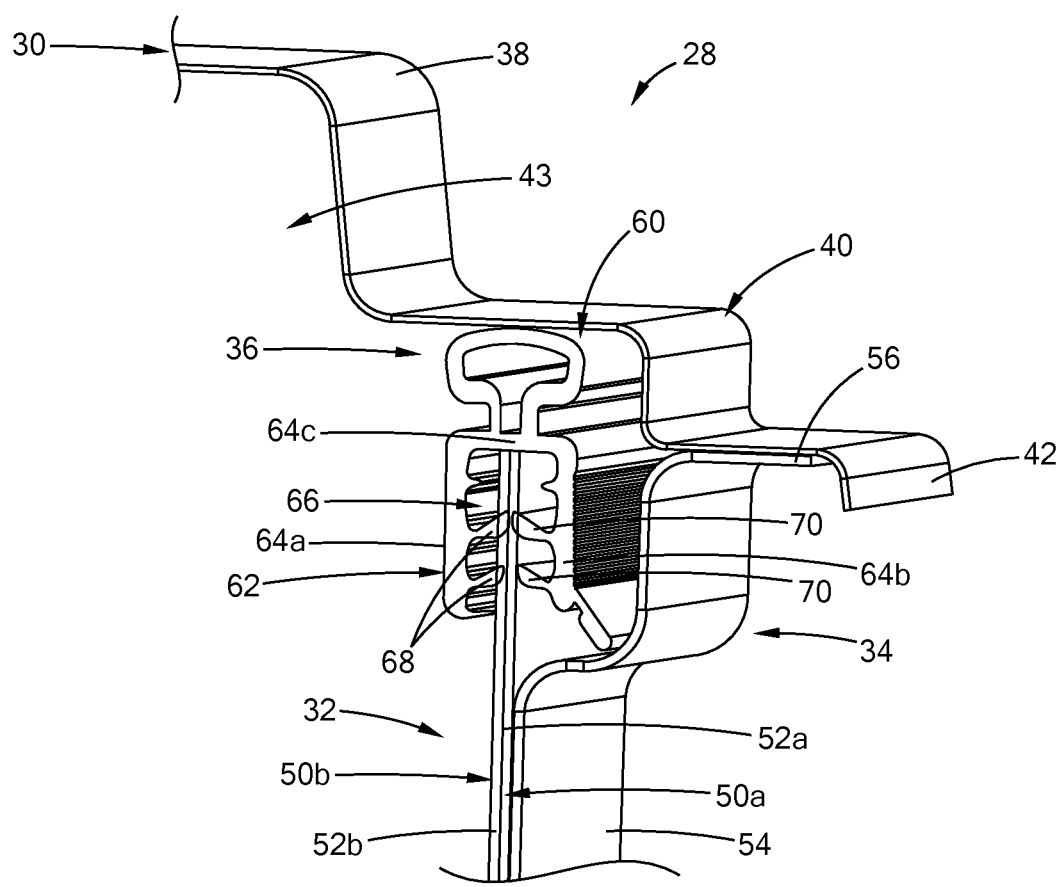
FIG. 4 is a cross-sectional perspective view taken along line 4-4 of FIG. 3.

With additional reference to FIGS. 2-4, the battery housing assembly 14 includes one or more battery arrays (not shown) and a battery tray or housing 28. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other.

The battery housing 28 may disposed at various locations of the vehicle 10 and is mounted to the vehicle frame 12. In this way, the battery housing 28 is supported by the vehicle frame 12 and is remote from a passenger cabin (not shown) and cargo compartments (not shown) of the vehicle 10, therefore, not occupying space that would otherwise be available for passengers or cargo. The battery housing 28 includes a cover or lid 30, a body 32, a plurality of connecting members 34 (only one shown in the figures), and a seal 36. The lid 30 at least partially overlaps the body 32 and is removably coupled to the body 32 via mechanical fasteners such as bolts or screws (not shown), for example. In this way, the lid 30 may be removed to service the battery arrays disposed within the battery housing 28.

As shown in FIG. 4, the lid 30 includes an upper portion 38, a stepped portion 40, and a flange portion 42. The upper portion 38 is planar and covers substantially an cavity 43 defined by the body 32. The stepped portion 40 is located between the upper portion 38 and the flange portion 42. The flange portion 42 extends from the stepped portion 40 away from the opening defined by the body 32. The flange portion 42 is located outwardly with respect to the body 32 and is also disposed below the upper portion 38 (i.e., the flange portion 42 is positioned closer toward the body 32 than the upper portion 38).

The body 32 includes a bottom wall or panel 48 and a plurality of segmented side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the battery housing 28 and are secured to each other via welding or an adhesive, for example. The side walls 50 also overlap each other. In the example illustrated, a first side wall 50a of the plurality of side walls 50 includes a first edge section 52a that is secured to and overlaps a second edge section 52b of an adjacent second side wall 50b of the plurality of side walls 50.

The plurality of connecting members 34 are disposed around side walls 50 of the body 32 and are spaced apart from each other. The connecting members 34 secure the lid 30 to the body 32. That is, each connecting member 34 is secured to an outer surface of a respective side wall 50 of the body 32 and to the flange portion 42 of the lid 30. As shown best in FIG. 4, each connecting member 34 includes a vertical end member 54 and a horizontal end member 56.

The vertical end member 54 is secured to a respective side wall 50a of the body 32 via welding, an adhesive, mechanical fasteners, or any other suitable attachment means. The horizontal end member 56 is secured to an inner planar surface of the flange portion 42 via mechanical fasteners. In this way, the lid 30 may be removed from the connecting members 34 to service the battery arrays disposed within the battery housing 28. In the example illustrated, the first edge section 52a is disposed between the second edge section 52b and the vertical end member 54.

The seal 36 is disposed around a periphery of the side walls 50 of the battery housing 28 and is engaged with side walls 50 and the lid 30. In this way, fluids, debris and other materials are inhibited from entering into the battery housing 28. In the example illustrated, the seal 36 is a bulb seal and is configured to extend along at least one segmented side wall 50 and an area where the first edge section 52a of the first side wall 50a overlaps the second edge section 52b of the adjacent second side wall 50b. The seal 36 is manufactured, for example, by an extrusion process and includes a bulb portion 60 and a body portion 62. The seal 36 may be a dual durometer rubber material where the bulb portion 60 has a hardness that is greater than a hardness of the body portion 62. The seal 36 is shown in FIG. 4 in its nominal position without being deformed.

The bulb portion 60 extends from the body portion 62 and is engaged with an inner planar surface of the stepped portion 40 of the lid 30. In the example illustrated, the body portion 62 is U-shaped and is spaced apart from the connecting member 34. The body portion 62 includes a plurality of walls 64a, 64b, 64c that cooperate to define a channel 66. The first edge section 52a of the first sidewall 50a and the second edge section 52b of the adjacent second side wall 50b are disposed within the channel 66. One or more sealing arms or members 68 extend from an inner surface of the wall 64a of the body portion 62 within the channel 66 and engage at least one segmented side wall 50. In the example illustrated, the sealing members 68 extending from the inner surface of the wall 64a also engage the second edge section 52b of side wall 50b. Similarly, one or more sealing arms or members 70 extend from an inner surface of the wall 64b of the body portion 62 within the channel 66 and engage at least one segmented side wall 50. In the example illustrated, the sealing members 70 extending from the inner surface of the wall 64b also engage the first edge section 52a of the side wall 50a that overlaps the second edge section 52b of the side wall 50b.

A liquid sealant such as mastic sealant is disposed within the channel 66 and further seals the area between the seal 36 and the side walls 50. The mastic sealant cures in an elastic state which further seals the area between the first edge section 52a that overlaps the second edge section 52b.

The battery housing 28 of the present disclosure provides the benefit of sealing a battery compartment where the battery arrays disposed within the battery compartment are stacked on top of each other, for example. The battery housing 28 of the present disclosure also provides the benefit of sealing an area where there is an overlap between side walls of the battery housing.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery housing for an electric vehicle comprising:
a cover;
a body secured to the cover and including a first edge section and a second edge section secured to and overlapping the first edge section; and
a seal engaged with the cover and including a channel, wherein the first and second edge sections of the body are disposed within the channel of the seal.

2. The battery housing of claim 1 further comprising a sealant disposed within the channel of the seal.

3. The battery housing of claim 1 further comprising a connecting member located outwardly with respect to the second edge section, the connecting member secured to an outer surface of the second edge section and removably secured to the cover.

4. The battery housing of claim 3, wherein the seal is spaced apart from the connecting member.

5. The battery housing of claim 3, wherein the connecting member is removably secured to the cover via a mechanical fastener.

6. The battery housing of claim 1, wherein the seal is engaged with a planar wall of the cover.

7. The battery housing of claim 1, wherein the channel has a U-shape.

8. The battery housing of claim 1, wherein the seal is a bulb seal.

9. The battery housing of claim 1, wherein the first and second edge sections of the body are secured together via welding or an adhesive.

10. The battery housing of claim 1, wherein the first and second edge sections are vertical walls.

11. The battery housing of claim 1, wherein the cover overlaps the first and second edge sections of the body.

12. A battery housing for an electric vehicle comprising:
a lid;
a body secured to the lid and including a plurality of segmented walls, a first wall of the plurality of walls includes a first edge section that is secured to and overlaps a second edge section of a second wall of the plurality of walls;
a seal engaged with the lid and including a channel; and
a sealant disposed within the channel of the seal,
wherein the first and second edge sections of the body are disposed within the channel of the seal.

13. The battery housing of claim 12, wherein the seal comprises at least one first sealing member extending from a first inner surface within the channel and engaging the first edge section.

14. The battery housing of claim 13, wherein the seal comprises at least one second sealing member extending from a second inner surface within the channel and engaging the second edge section.

15. The battery housing of claim 12, wherein the seal comprises at least one sealing member extending from an inner surface within the channel and engaging the second edge section.

16. The battery housing of claim 12 further comprising a connecting member located outwardly with respect to the second edge section, the connecting member secured to an outer surface of the second edge section and removably secured to the lid.

17. The battery housing of claim 12, wherein the sealant is a mastic sealant.

18. The battery housing of claim 12, wherein the first and second edge sections of the body are secured together via welding or an adhesive.

19. The battery housing of claim 12, wherein the first and second edge sections are vertical walls.

20. A battery housing for an electric vehicle comprising:
a cover;
a body removably coupled to the cover and including a first vertical wall and a second vertical wall secured to and overlapping the first vertical wall;
a seal engaged with the cover and including a channel, the first and second vertical walls of the body are disposed within the channel of the seal;
a connecting member spaced apart from the seal and located outwardly with respect to the second vertical wall, the connecting member secured to an outer surface of the second vertical wall and secured to the cover; and
a sealant disposed within the channel of the seal.

* * * * *